United States Patent [19]

Johnson

[11] 4,322,025

[45] Mar. 30, 1982

[54] TOOL FOR CUTTING OPTICAL FIBERS

[75] Inventor: Erlon F. Johnson, Elizabethtown, Pa.

[73] Assignee: AMP Incorporated, Harrisburg, Pa.

[21] Appl. No.: 183,776

[22] Filed: Sep. 3, 1980

[51] Int. Cl.³ .............................................. C03B 37/16
[52] U.S. Cl. ........................................ 225/96.5; 225/2
[58] Field of Search .................... 225/2, 96.5; 29/413; 65/2, 56, 112, 174

[56] References Cited

U.S. PATENT DOCUMENTS

| | | | |
|---|---|---|---|
| 3,934,773 | 1/1976 | Chinnock et al. | 225/2 |
| 4,017,013 | 4/1977 | Hawk et al. | 225/96.5 |
| 4,036,419 | 7/1977 | Hensel et al. | 225/96.5 |
| 4,074,484 | 2/1978 | Fulenwider et al. | 225/96.5 |
| 4,154,385 | 5/1979 | Lewis | 225/96.5 |
| 4,159,793 | 7/1979 | Belmonte et al. | 225/96.5 |
| 4,168,026 | 9/1979 | Lukas et al. | 225/96.5 |
| 4,202,475 | 5/1980 | Hirai et al. | 225/2 |
| 4,203,539 | 5/1980 | Miller | 225/2 |
| 4,257,546 | 3/1981 | Benasutti | 225/96.5 |

OTHER PUBLICATIONS

Optical Fiber Cutting Tool and Automatic Splicing Machine, Sumitomo Electric Technical Review, No. 19, pp. 85–91, Jan. 1980.

*Primary Examiner*—Frank T. Yost
*Attorney, Agent, or Firm*—Adrian J. LaRue

[57] ABSTRACT

An improved tool for cutting optical fibers by the scribe-and-break technique is provided. The tool has a scribing edge transversely directed with respect to, and normally spaced from, an arcuate convex fiber supporting surface. When moved normally with respect to the fiber supporting surface, the scribing edge defines a scribing plane. Spring members, located on opposite sides of the scribing plane, are compressed between the fiber supporting surface and a bearing surface, causing the optical fiber to be clamped between the spring members and the fiber supporting surface. This compression also forces the spring members to slide longitudinally along the fiber supporting surface away from the scribing plane, imparting an axial tensile stress to the optical fiber. The optical fiber is finally scribed by the scribing edge, resulting in propagation of a fraction over the cross section.

18 Claims, 5 Drawing Figures

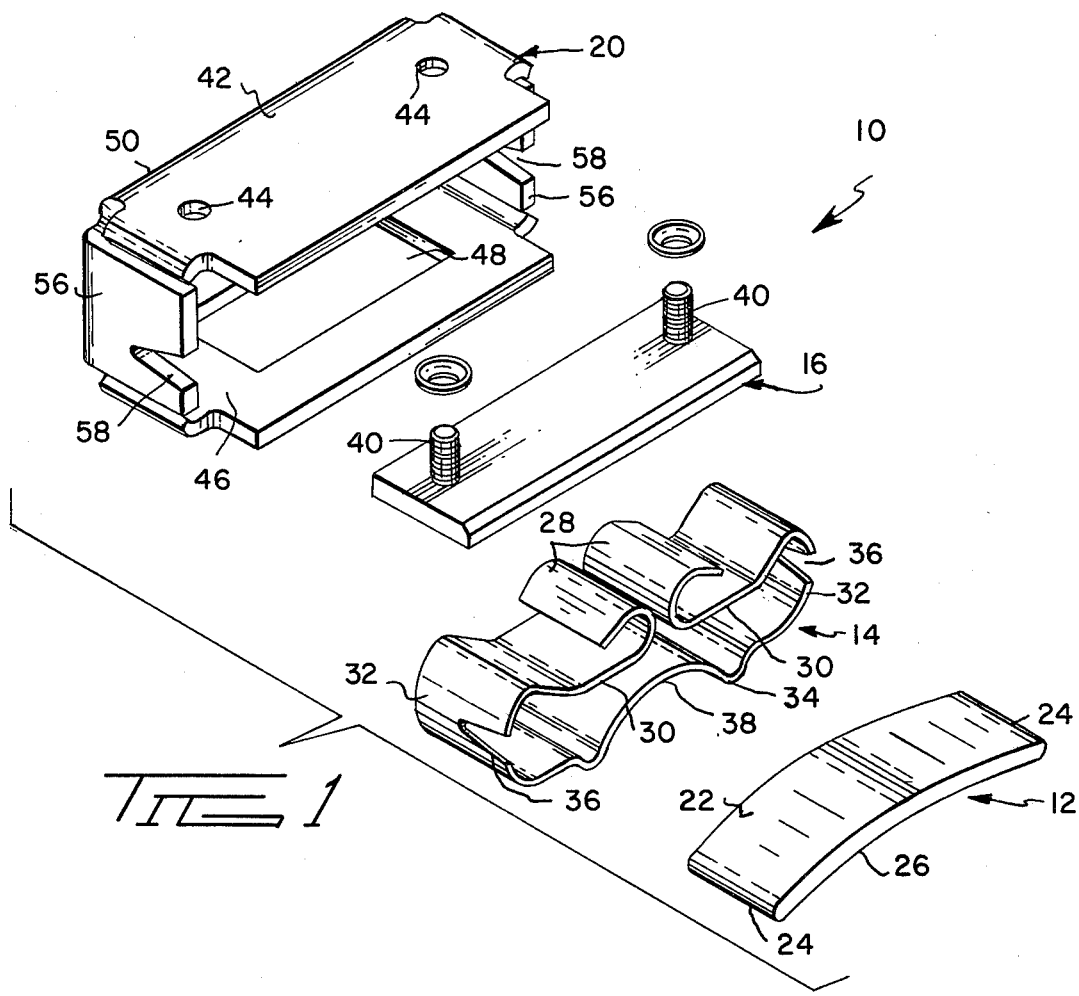
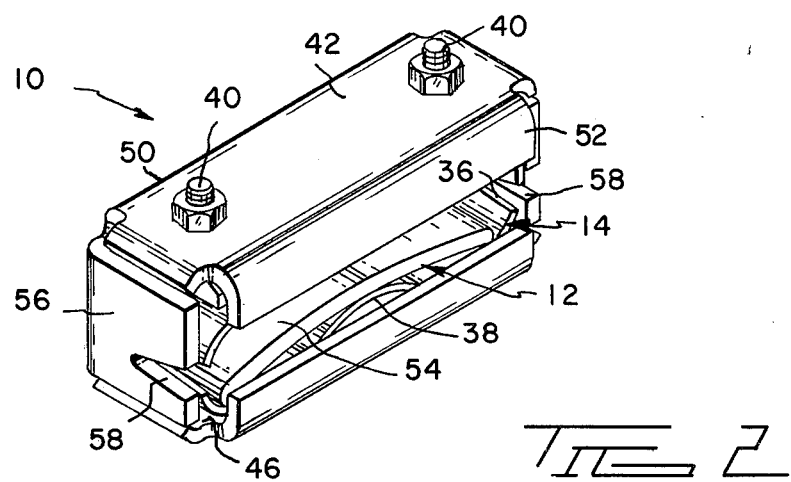

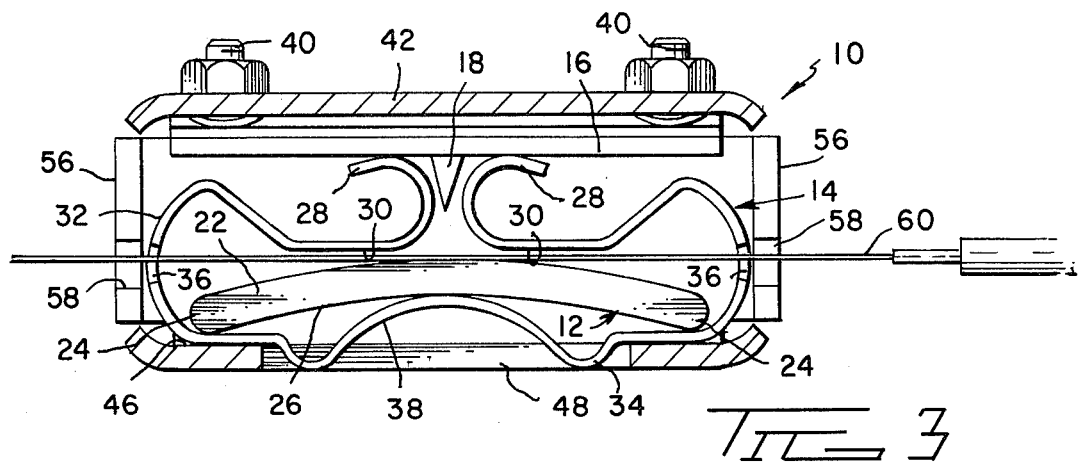
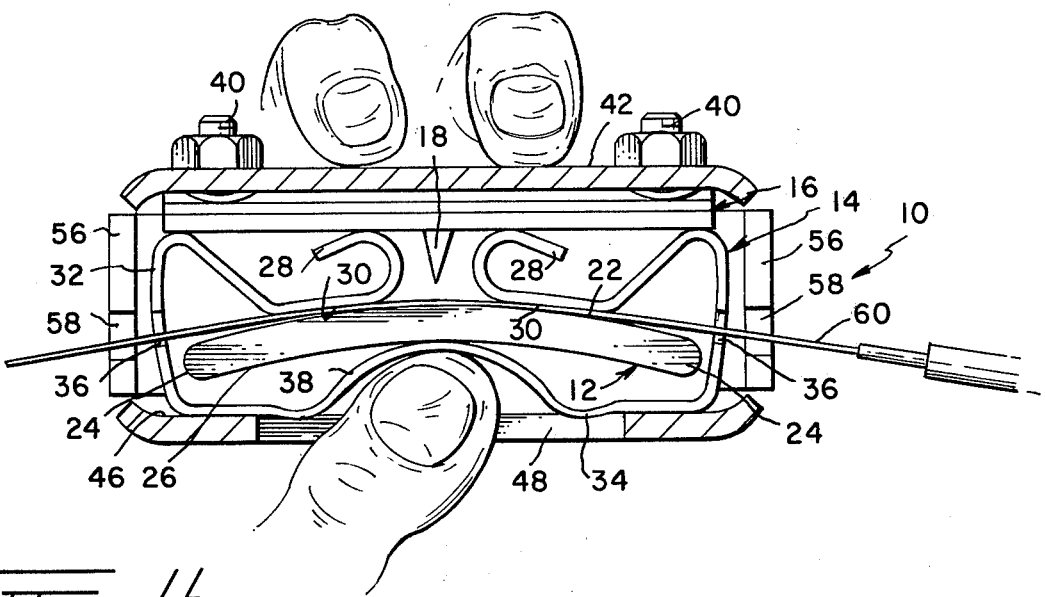
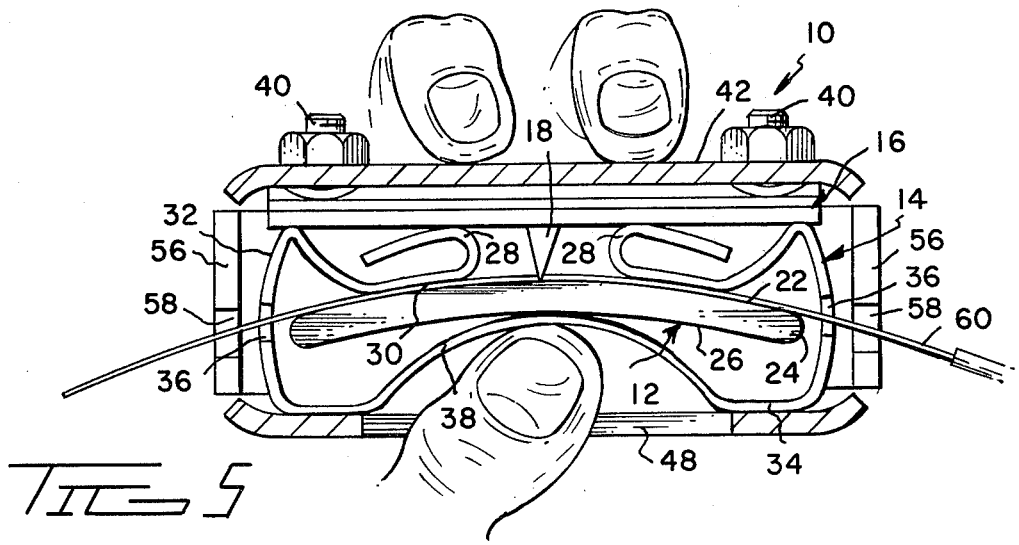

TOOL FOR CUTTING OPTICAL FIBERS

BACKGROUND OF THE INVENTION

1. The Field of the Invention

The present invention relates to an improved tool, and more particularly a hand tool, for performing the scribe-and-break technique, a method employed to cut optical fibers which yields fiber ends that are smooth, flat, and perpendicular to the fiber axis.

2. The Prior Art

To achieve efficient transmission of energy light signals through an optical fiber splice, the fiber ends must be smooth, flat, and perpendicular to the fiber axis. It is generally known that the scribe-and-break technique adequately yields the desired fiber ends. Basically, this technique involves stretching an optical fiber over an arcuate surface and lightly scribing the fiber with a sharp edge to produce a fracture which is diametrically propagated through the fiber to produce the requisite end surface.

Hand tools currently in use to scribe-and-break optical fibers are both complicated in design, that is, having many moving parts, and expensive. See, for example, U.S. Pat. Nos. 4,154,385; 4,159,793; 4,168,026; and 4,202,475. Since such tools are likely to be used in harsh field environments, with each tool expected to withstand repeatd duty cycles, it is therefore imperative that their construction be durable, and readily repairable. Moreover, it is desirable for scribe-and-break tools to be of simple design, and accordingly inexpensive, since loss of tools in field applications is not uncommon.

SUMMARY OF THE PRESENT INVENTION

A tool for cutting optical fibers by the scribe-and-break technique in accordance with the present invention includes an arcuate convex fiber supporting surface. Normally spaced from, and transversely directed with respect to, the fiber supporting surface is a fiber scribing edge, which, when moved normally with respect to the fiber supporting surface, defines a scribing plane. Facing toward, and normally spaced from, the fiber supporting surface is a bearing surface. Spring members, which both grip and tension the optical fiber, are located on opposite sides of the scribing plane between the bearing and fiber supporting surfaces. As these two surfaces are moved relatively toward each other, the spring members compress, causing the optical fiber to be clamped between the fiber supporting surface and a gripping portion of each spring member. Further compression of the spring members causes the gripping portions to move longitudinally along the fiber supporting surface in opposite directions away from the scribing plane. This longitudinal motion imparts an axial tensile stress to the optical fiber. Finally, while under both bending and axial tensile stresses, the optical fiber is lightly scribed by the scribing edge, resulting in propagation of a fracture over the fiber cross section.

It is therefore an object of the present invention to provide a tool for scribing and breaking an optical fiber which results in a smooth, flat perpendicular end.

It is another object of the present invention to provide a tool for scribing and breaking an optical fiber which is relatively simple in design with few moving parts.

It is a further object of the present invention to provide a tool for scribing and breaking an optical fiber which can be readily and economically manufactured.

BRIEF DESCRIPTION OF THE ACCOMPANYING DRAWINGS

FIG. 1 is an exploded perspective view of an optical fiber scribe-and-break tool in accordance with the present invention;

FIG. 2 is a perspective view of a fully assembled optical fiber scribe-and-break tool in accordance with the present invention;

FIG. 3 is a section through the tool showing an optical fiber in place prior to actuation of the tool;

FIG. 4 is a section through the tool showing the compressed U-shaped free ends clamping and tensioning an optical fiber; and FIG. 5 is a section through the tool showing an optical fiber in the scribing position.

DETAILED DESCRIPTION OF THE PREFERRED EMBODIMENT

A hand tool 10 for cutting optical fibers by the scribe-and-break technique in accordance with the present invention, FIGS. 1 and 2, comprises an anvil 12, a spring member 24, a bearing surface 16 having a scribing edge 18 centrally mounted thereon (see FIG. 3), and a prismoidal frame 20. The anvil 12 has a fiber supporting surface 22 of arcuate convex shape extending between opposite ends 24, and a second surface 26 opposed to the fiber supporting surface 22.

The spring member 14 is an elongated plate formed to surround the anvil 12 having U-shaped free ends 28 located on opposite sides of a scribing plane defined by the scribing edge 18. The spring member 14 extends symmetrically from the scribing plane to gripping portions 30, then to end portions 32 which wrap around the opposite ends 24 of the anvil 12, and finally to a longitudinal portion 34 which is located adjacent to the second surface 26 of the anvil 12. Each end portion 32 has a fiber receiving slot 36, and the longitudinal portion 34 has a deformable concave portion 38.

The bearing surface 16, which faces the fiber supporting surface 22 with the spring member U-shaped free end portions 28 therebetween, has adjustable mounting means 40 such as a pair of nut, bolt and resilient washer assemblies as shown or an equivalent substitute familiar to those skilled in the art.

The prismoidal frame 20 encloses the anvil 12, spring member 14, and bearing surface 16. The frame 20 has a top side 42 having a pair of holes 44 to accept the mounting means 40, a bottom side having an aperture 48 large enough to provide thumb or finger access, a back side 50, and a front side 52 having a slot 54 through its entire length. The frame 20 also has opposed ends 56 each having a fiber receiving slot 58.

Referring to FIG. 3, the operation of cutting an optical fiber is initiated by inserting the optical fiber 60 through the front side slot 54 and into the spring member fiber receiving slots 36 and the frame end fiber receiving slots 58. Optionally, either the spring member fiber receiving slots 36 or the frame end fiber receiving slots 58 are designed to transversely align the optical fiber 60 on the fiber supporting surface 22. During insertion of the optical fiber 60, the spring member 14 is in an unactuated condition.

Referring to FIG. 4, the spring member 14 is actuated by application of a normal force, using a thumb or finger, to the deformable concave portion 38. This force causes the anvil 12 to move relatively toward the bearing surface 16 and scribing edge 18, compressing the spring member U-shaped free end portions 28 between the bearing surface 16 and the fiber supporting surface 22. As the free end portions 28 are compressed, the gripping portions 30 clamp the optical fiber 60 to the fiber supporting surface 22. Additionally, in resisting compression, the U-shaped end portions 28 move in opposite directions away from the scribing plane as the gripping portions 30 slide longitudinally along the fiber supporting surface 22, imparting an axial tensile stress to the optical fiber 60.

This process continues until the optical fiber 60 is brought into contact with the scribing edge 18, as in FIG. 5. At this point, the opitcal fiber 60 is under both a bending and axial tensile stress which yields a net decreasing tensile stress across the fiber cross section. The optical fiber 60 is lightly scribed by the scribing edge 18, resulting in propagation of a fracture. The scribing edge 18 can be rotated slightly about the scribing plane using the adjustable mounting means 40. Such adjustment may be critical in achieving a clean fracture, especially after the scribing edge 18 has been worn from use. Further, the scribing edge 18 can be replaced when worn beyond use simply by dismounting the bearing surface 16 from the top side 42 and installing a new one.

While the above description is of a preferred embodiment of the subject invention, the scope of the present invention is not to be confined thereto. Other embodiments which utilize the teachings herein set forth are intended to be within the scope and spirit of this invention.

What is claimed is:

1. An improved tool for scribing and breaking at least one optical fiber, of the type comprising means for scribing said fiber in a scribing plane, fiber supporting means for supporting and transporting a length of said fiber toward said scribing means in an axially normal intersection of said scribing plane, and fiber tensioning means for placing said length of fiber in axial tension, the improvement comprising:

said fiber supporting means comprising an arcuately convex profiled surface;

said fiber tensioning means comprising spring means conformable to said convex profiled surface for incrementally and directionally pressuring portions of said fiber length on opposite sides of said scribing plane against said arcuate convex surface and away from said scribing plane as said fiber is transported into engagement against said scribing means, whereby imparting an axial tension into said length of fiber.

2. A tool as set forth in claim 1, said spring means comprising bearing surface means disposed on said opposite sides of said scribing plane and facing said convex surface, and compressive spring elements disposed on opposite sides of said scribing plane and placed in compression between said portions of said fiber length and said bearing surface means as said fiber is transported into engagement against said scribing means.

3. A tool as set forth in claim 1, wherein said spring elements each comprising a reversely formed U-shaped plate member.

4. A tool as set forth in claim 3, said spring elements further comprising remote ends of an elongated plate member which is formed to surround said convex profiled surface, and said plate member having a transversely directed optical fiber receiving slot formed therein to access an optical fiber onto said convex profiled surface.

5. A tool as set forth in claim 4, said elongate plate member further comprising a flexible longitudinal portion located adjacent and beneath said convex surface, and adapted to deform upwardly to influence said convex fiber supporting surface toward said scribing means.

6. An improved tool for bending and axially tensioning a portion of at least one optical fiber, and also for scribing said optical fiber while said optical fiber is bent and axially tensioned, which results in propagation of a fracture over the cross section of said optical fiber, said tool being of the general type including bending means which is an arcuate convex fiber supporting surface, a fiber scribing edge arranged to scribe said optical fiber with said optical fiber over said fiber supporting surface, said scribing edge being normally spaced from, and transversely directed with respect to, said fiber supporting surface, movement of said scribing edge normally with respect to said fiber supporting surface defining a scribing plane, fiber gripping means located on opposite sides of said scribing plane, and fiber axial tensioning means located on opposite sides of said scribing plane, wherein the improvement comprises:

frame means having a bearing surface facing toward, and normally spaced from, said fiber supporting surface; and means for gripping and tensioning said optical fiber as said fiber supporting surface and said bearing surface are relatively moved toward each other comprising spring means, said spring means located on opposite sides of said scribing plane between said bearing surface and said fiber supporting surface, each said spring means having a gripping portion being comformable to said fiber supporting surface, said spring means being compressible by relative movement of said fiber supporting surface and said bearing surface toward each other so that said gripping portions initially contact said fiber supporting surface and further compression of said spring means causes said gripping portions to move longitudinally along said fiber supporting surface in opposite directions away from said scribing plane, said longitudinal movement imparting an axial tensile stress to said optical fiber.

7. An improved tool as recited in claim 6, wherein said frame means comprises:

a top side having said bearing surface adjustably mounted thereon; and opposed ends each having a transversely directed optical fiber receiving slot.

8. An improved tool as recited in claim 6, wherein said spring means comprises a plate member of flexible material located on opposite sides of said scribing plane, each said plate member formed into a U-shape, the open end of said U-shape pointing away from said scribing plane, the portion of said U-shape adjacent to said fiber supporting surface being said gripping portion of said spring means whereby, relative movement of said fiber supporting surface and said bearing surface toward each other causes compression of said U-shape between said bearing surface and said fiber supporting surface, said compression initially forces said gripping portions against said fiber supporting surface to clamp said optical fiber therebetween, and further said compression forces said gripping portions to move longitudinally along said fiber supporting surface in opposite directions away from said scribing plane, said longitudinal movement imparting an axial tensile stress to said optical fiber.

9. An improved tool as recited in claim 8, wherein said bending means comprises an anvil having a fiber supporting surface and a second surface opposed from said fiber supporting surface, said anvil having opposite ends, said fiber supporting surface extending between said ends as an arcuate convex surface.

10. An improved tool as recited in claim 9, wherein said U-shaped plate members are free end portions of an elongated plate member which is formed to surround said anvil, said plate member extending from said U-shaped free end portions to end portions which wrap around said opposite ends of said anvil, and finally to a longitudinal portion located adjacent to said second surface of said anvil, each said end portion having a transversely directed optical fiber receiving slot.

11. An improved tool as recited in claim 10, wherein said longitudinal portion of said plate member has a deformable concave portion to facilitate manual application of a normal force using a thumb or finger to relatively move said anvil toward said bearing surface.

12. An improved tool as recited in claim 10, wherein said optical fiber receiving slot in said end portions of said plate member provides transverse alignment of said optical fiber on said fiber supporting surface.

13. An improved tool as recited in claim 9, wherein said frame means comprises a four-sided hollow prismoid enclosing said spring means, said anvil, said scribing means, and said bearing surface, said prismoid including:
- a top side, said bearing surface interposed between said top side and said fiber supporting surface, said bearing surface adjustably mounted on said top side;
- a bottom side opposed from said top side, said bottom side having an aperture to provide thumb or finger access for applying a normal force to said anvil to cause relative movement of said fiber supporting surface toward said bearing surface;
- a front and back side located on transversely opposed sides of said anvil, said front side having a slot through its entire longitudinal length to allow insertion of said optical fiber; and
- opposed ends each having a transversely directed optical fiber receiving slot which opens toward said slot in said front side.

14. An improved tool as recited in claim 13, wherein said optical fiber receiving slot in said ends of said frame means provides transverse alignment of said optical fiber on said fiber supporting surface.

15. An improved tool as recited in claim 6, wherein said scribing edge is mounted on said bearing surface.

16. An improved tool for bending and axially tensioning a portion of at least one optical fiber, and also for scribing said optical fiber while said optical fiber is bent and axially tensioned, said tool comprising:
- an anvil for bending said optical fiber, said anvil having a fiber supporting surface and a second surface opposed from said fiber supporting surface, said anvil having opposite ends, said fiber supporting surface extending between said ends as an arcuate convex surface;
- a bearing surface facing toward, and normally spaced from, said fiber supporting surface;
- a fiber scribing edge mounted on said bearing surface, said scribing edge being normally spaced from and transversely directed with respect to, said fiber supporting surface, movement of said scribing edge normally with respect to said fiber supporting surface defining a scribing plane;
- means for gripping and tensioning said optical fiber as said fiber supporting surface and said bearing surface are relatively moved toward each other comprising an elongated plate member of flexible material which acts as a spring, said plate member formed to surround said anvil by extending from a longitudinal portion located adjacent to said second surface of said anvil, to end portions which wrap around said opposite ends of said anvil, and finally to free end portions located between said bearing surface and said fiber supporting surface and adjacent to opposite sides of said scribing plane, said longitudinal portion having a deformable concave portion to facilitate manual application of a normal force using a thumb or finger to relatively move said anvil toward said bearing surface, each said end portion having a transversely directed optical fiber receiving slot, each said free end being formed into a U-shape, the open end of said U-shape pointing away from said scribing plane, the portion of said U-shape adjacent to said fiber supporting surface being a gripping portion conformable to said fiber supporting surface; and
- frame means comprising a four-sided hollow prismoid enclosing said plate member, said anvil, said scribing means, and said bearing surface therein, said prismoid including a top side, said bearing surface interposed between said top side and said fiber supporting surface, said bearing surface adjustably mounted to said top side, a bottom side opposed to said top side, said bottom side having an aperture to provide thumb or finger access for applying a normal force to said anvil to cause relative movement of said fiber supporting surface toward said bearing surface, a front and back side located on transversely opposed sides of said anvil, said front side having a slot through its entire longitudinal length to allow insertion of said optical fiber, and opposed ends each having a transversely directed optical fiber receiving slot which opens toward said slot in said front side.

17. An improved tool as recited in claim 16, wherein said optical fiber receiving slot in said end portions of said plate member provides transverse alignment of said optical fiber on said fiber supporting surface.

18. An improved tool as recited in claim 16, wherein said optical fiber receiving slot in said ends of said frame means provides transverse alignment of said optical fiber on said fiber supporting surface.

* * * * *